United States Patent [19]

Hall, III

[11] Patent Number: 5,056,874
[45] Date of Patent: Oct. 15, 1991

[54] BRAKE CONTROL VALVE

[75] Inventor: Arthur Hall, III, Cicero, Ind.

[73] Assignee: General Motors Corporation, Detroit, Mich.

[21] Appl. No.: 617,322

[22] Filed: Nov. 3, 1990

[51] Int. Cl.$^5$ .............................................. B60T 15/04
[52] U.S. Cl. ........................................ 303/50; 303/49; 303/54; 303/56; 188/358
[58] Field of Search ...................... 303/50, 52, 54, 56, 303/10, 57, 59, 60, 49, 48; 188/358, 359, 290, 264 R, 264 P, 264 B; 60/566, 565, 547.1, 560; 91/32, 5, 6

[56] References Cited

U.S. PATENT DOCUMENTS

| 2,698,205 | 12/1954 | Gagen | 188/358 X |
| 2,887,187 | 5/1959 | Fletcher et al. | 188/358 |
| 2,912,286 | 11/1959 | Evans | 188/358 X |
| 3,183,041 | 5/1965 | Grossnickle et al. | 303/49 |
| 3,514,163 | 5/1970 | MacDuff | 303/49 |
| 4,444,440 | 4/1984 | Farr | 303/50 |
| 4,836,341 | 6/1989 | Hall, III | 303/10 X |

Primary Examiner—Douglas C. Butler
Attorney, Agent, or Firm—Donald F. Scherer

[57] ABSTRACT

A brake control has a regulator valve to establish the pressure in the brake system during brake apply. A flow regulator valve permits a fast flow rate for filling of the system when brake apply is initiated and a slow flow rate when the brake system pressure approaches the value established by the regulator valve.

2 Claims, 1 Drawing Sheet

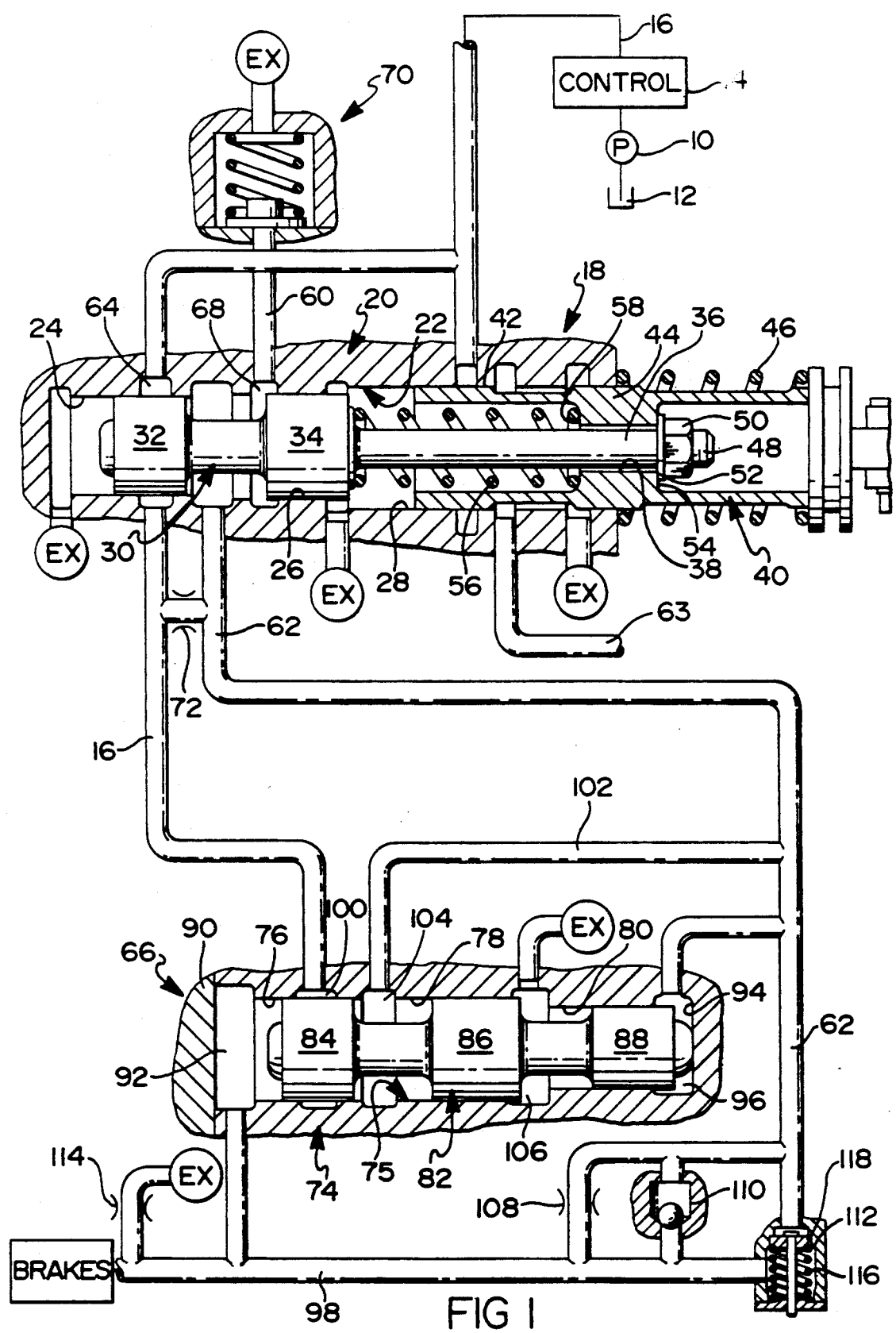

BRAKE CONTROL VALVE

The invention herein described was made in the course of work under a contract or subcontract thereunder with the Department of the Army.

BACKGROUND OF THE INVENTION

This invention relates to brake control systems, and more particularly, to such systems wherein the brake apply pressure and the flow rate through the brakes are controlled by valve members.

In track laying vehicles, the hydraulic brake pressure is controlled by a regulator valve which is actuated by the operator. The amount of actuation (input travel supply by the operator) determines the pressure that is transmitted to the brakes. During partial brake apply (i.e. small input travel distance), the apply pressure is low and can result in extended actuation times which delays the movement of the brake apply pistons.

SUMMARY OF THE INVENTION

The present invention provides a valve system that will fill the brake apply system and initiate movement of the brake apply pistons in a substantially constant time. This is accomplished through a flow regulating valve member that provides a secondary apply passage which is initially opened to a high pressure source to supply brake apply fluid at a high rate to the brake apply pistons.

A pair of pressure responsive chambers and a flow restriction cooperate with the flow regulating valve member to disconnect the high pressure source from the secondary apply passage when the brake apply pistons have completed their stroke and the flow rate to the brake apply pistons is decreased.

It is therefore an object of this invention to provide an improved brake control valve mechanism, wherein a flow regulator valve is operable to permit an initial high flow rate from a pressure source to actuate the brake apply pistons, and is also operable to disconnect the high pressure source when the flow rate decreases below a predetermined value.

It is another object of this invention to provide an improved brake control valve mechanism, wherein a flow regulator valve and a flow detector valve cooperate to provide a high flow rate at brake initiation, and a reduced flow rate when the brake apply pistons have been stroked to cause brake engagement.

DESCRIPTION OF THE DRAWING

The drawing is a diagrammatic representation of a valve mechanism incorporating the present invention.

DESCRIPTION OF AN EXEMPLARY EMBODIMENT

The control system shown in the drawing includes a conventional positive displacement pump 10 which draws fluid from a reservoir 12 for delivery to a conventional control mechanism 14. The control mechanism 14 is operable to distribute pressurized fluid from the pump 10 to various transmission components, which are not shown, and to a brake apply system via a passage 16. The fluid pressure in passage 16 is generally equal to the main supply pressure of the control mechanism 14.

The passage 16 is connected to a brake apply regulator valve, generally designated 18, which includes a valve body 20 in which is formed a multi-step diameter bore 22. The bore 22 has a first and smallest diameter bore 24 disposed adjacent the left end thereof, an intermediate diameter bore 26 and a large diameter bore 28. The small diameter bore 24 and intermediate diameter bore 26 slidably support a valve spool 30 which includes a first valve land 32 slidably disposed in bore 24 and a large valve land 34 slidably disposed in the bore 26.

Extending rightwardly from the valve land 34 is a valve stem 36 which passes through an opening 38 formed in an operator input member 40. The operator input member 40 includes a pair of spaced lands 42 and 44 which are slidably disposed in the bore 28. The operator member 40 is urged rightwardly by a compression spring 46.

The stem 36 has a threaded end 48 on which a nut 50 is threaded to position a washer 52 which is disposed to abut a shoulder 54 formed in the operator member 40. A compression spring 56 is disposed circumjacent the stem 36 between the valve land 34 and a shoulder 58, also formed on the operator member 40. In the spring set position shown, the spring 56 urges separation between the valve spool 30 and the operator member 40 which is limited by the washer 52 being placed in abutment with the shoulder 54. The "at rest" or spring set position of the brake apply regulator valve 18, as determined by the spring 46, provides the positioning of the valve spool 30 and operator input 40, as shown.

The valve bore 22 is disposed in fluid communication with the passage 16, a low pressure passage 60, primary brake apply passage 62 and a brake signal passage 63. There are also a plurality of exhaust passages (EX) connected to the valve bore 22, as shown. The passage 16 is connected with an annular port 64 such that fluid in passage 16 is permitted to bypass the valve 18 for connection with a flow regulator valve 66.

The primary brake apply passage is in fluid communication between the bores 24 and 26. The low pressure passage 60 is in fluid communication with an annular port 68 which is formed in the bore 26 such that in the valve position shown, the passage 62 is opened to the passage 60 between the valve lands 32 and 34. The passage 60 is in fluid communication with a conventional regulator valve 70 which maintains a minimum pressure within the primary brake apply passage 62. The primary brake apply passage 62 is also in fluid communication with the main passage 16 through a restriction 72 such that a constant low flow fluid source is available to the primary brake apply passage 62.

The large diameter bore 28 is disposed in fluid communication with the passage 16 and the brake signal passage 63. Fluid communication between the passage 16 and the port 64 is controlled by the operator input member 40 and the space between the lands 42 and 44. When the operator input member 40 is moved leftward against the spring 46, fluid pressure is provided between the passage 16 and port 64. The port 64 is in fluid communication with a lubrication and cooling system, not shown, which is operable to provide fluid through the vehicle brakes for cooling and lubrication when the brakes are applied. In the spring set and at rest position shown, the brake signal passage 63 is connected to exhaust while the passage 16 is blocked by the land 42.

The flow regulator valve 66 includes a valve body 74 which has formed therein a valve bore 75 having a pair of equal diameter bores 76, 78 and a small diameter bore 80. A valve spool 82 is disposed within the valve bore 75 and includes a pair of equal diameter spaced lands 84 and 86 slidably disposed in the bores 76 and 78, respectively, and a small diameter land 88 slidably disposed in the bore 80.

The valve land 84, valve bore 75 and an end cover 90 cooperate to form a pressure responsive chamber 92 adjacent the end of valve spool 82. The valve land 88, valve bore 75 and an end wall 94 cooperate to form a pressure responsive chamber 96 which is smaller than the pressure responsive chamber 92. The pressure responsive chamber 92 is in fluid communication with a brake feed passage 98 and the pressure responsive chamber 96 is in fluid communication with the primary brake apply passage 62.

The valve bore 75 is in fluid communication with the passage 16 at an annular port 100 formed in the bore 76, with a secondary brake apply passage 102 at an annular port 104 formed between the bores 76 and 78, and an exhaust passage connected with an annular port 106 between the bores 78 and 80.

Brake feed passage 98 is in fluid communication with the primary brake apply passage 62 through a restriction 108, a free flow check valve 110 and a flow detector pressure reduction valve 112. The primary brake apply passage 62 is also in fluid communication with the secondary brake apply passage 102. When the low flow conditions are present, the pressure in passage 98 is equal to the pressure in passage 62.

The flow restriction 108 permits a constant supply of fluid pressure to the brake feed passage 98 which is continuously connected to exhaust through a restricted passage 114. This ensures that the brake apply pistons, not shown, are continuously filled with low pressure fluid. The fluid is maintained at a pressure sufficiently low, by valve 70, so that the brake return springs disposed within the brake system will maintain the brake pistons in an unactuated position.

The free flow check valve 110 permits unrestrained flow from the brake feed passage 98 to the primary brake apply passage 62, but prevents fluid flow in the opposite direction. The flow detector valve 112 includes a compression spring 116 which urges a valve head 188 toward a seated position to restrict fluid flow between the passage 62 and the brake feed passage 98. The valve 112 ensures that a sufficiently high pressure is available in the primary brake apply passage 62 before permitting full fluid flow to the brake feed passage 98. Whenever there is sufficient pressure differential between the passages 62 and 98, the valve 112 will permit substantially unrestricted but reduced pressure flow therebetween, thus establishing a high flow rate for the system brakes which will cause rapid stroking of the brake apply pistons, not shown.

When a brake request has been made by the operator, the valve system will be substantially as shown. In this condition, the restriction 108 will not establish a pressure differential due to fluid flow between the passages 62 and 98 such that the pressure in pressure responsive chamber 92 will be sufficient to overcome the force established in the valve spool 82 by fluid pressure in the pressure responsive chamber 96, whereby the valve land 84 will be positioned to close communication between passage 16 and the secondary apply passage 102.

When the operator requests a brake application, the operator input member 40 is moved leftward thereby imposing a force on the valve spool 30 through the spring 56. This will result in the valve spool 30 also moving leftward such that valve land 34 will close to passage 60 while valve land 32 will open the port 64 permitting unrestricted fluid communication between the passages 16 and 62.

The sudden rise in fluid pressure in passage 62 will operate in the pressure response chamber 96 to urge the valve spool 82 leftward thereby providing fluid communication between passage 16 and the secondary brake apply passage 102 such that unrestricted fluid flow is provided at the flow restriction 108 and flow detector valve 112.

The flow restriction 108 will prevent the pressure in brake feed passage 98 from rising as abruptly as the pressure in passage 62. However, due to the pressure differential, the flow detector valve 112 will open to permit a reduced pressure fluid to enter passage 98. The pressure level will be sufficient to cause a stroking of the brake apply pistons. The pressure reduction caused by valve 112 is designed to prevent the pressure in chamber 92 from being sufficient to overcome the force on the valve spool 82 caused by the pressure in chamber 96. As the brake apply pistons reach the end of their stroke, and less fluid volume is required, the pressure in passage 98 will begin to increase as the flow through restriction 108 decreases, thereby increasing the pressure in the pressure responsive chamber 92. At a predetermined pressure ratio between the chambers 92 and 96, the valve spool 82 will move rightward to the position shown thereby disconnecting passage 16 from the secondary brake apply passage 102.

After this occurs, any further fluid flow to the brake system is supplied via the primary brake apply passage 62, restriction 108 and passage 98. The brake system pressure is established in primary brake apply passage 62 by the operator input member 40 imposing a force upon the spring 56. The spring 56 urges the valve spool 30 leftward permitting some fluid communication between the valve lands 32 and 34, and thence to the passage 62. However, due to the area differential between the valve lands 32 and 34, a rightward force is imposed upon the valve spool 30 which will reach a level sufficient to overcome the force in the spring 56, thereby limiting the pressure within the primary brake apply passage 62. This also limits the fluid pressure in the brake feed passage 98.

At this point in brake application, the fluid flow necessary to maintain the brake supplied is very low. Therefore, the pressure drop across restriction 108 is minor which results in the equalization of pressure between the passages 62 and 98. At this point in brake application, the restriction 114 and any system leakage at the brake apply pistons, controls the amount of fluid flow in the passage 98. The pressure in passage 62 is determined by the force imposed on spring 56 by the operator input 40. Thus, for maximum brake apply, the force in spring 56 will be high, resulting in a high brake apply pressure being established in passages 62 and 98.

For low brake apply forces, the brake pressure in passages 62 and 98 will, of course, be low. However, the initial brake apply force will result in the initial full flow of fluid from passage 16 to passage 62 which, as explained above, controls the movement of the flow regulator valve 66. Thus, the time required to fill the brake system while moving the brake apply pistons to the point of complete engagement, is substantially constant regardless of the operator input force applied to the operator input member 40.

With the present invention therefore, the operator will not recognize any time differential between application to the operator brake pedal and the initial engagement of the vehicle brakes.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A brake control valve apparatus comprising: a source of fluid pressure; a brake feed passage; a primary brake apply passage; a secondary brake apply passage in fluid communication with the primary brake apply passage; exhaust passage means; brake apply regulator valve means comprising operator input means for establishing a desired braking level, valve means operatively connected with the operator input means for controlling fluid flow from said source of fluid pressure to said primary brake apply passage at a pressure level determined by said operator input means; flow regulator valve means for selectively connecting said source to said secondary brake apply passage comprising a first pressure responsive area; means for urging said flow regulator valve means to a first position connecting said source to said secondary brake apply passage in response to fluid pressure is said primary brake apply passage, and a second pressure responsive area means in fluid communication with said brake feed passage for urging said flow regulator valve means to a second position disconnecting said source from said secondary brake apply passage in response to pressure in said brake feed passage; and flow restriction means and pressure reduction means disposed in parallel fluid flow relation between said primary brake apply passage and said brake feed passage for controlling both the change in pressure level of the fluid in said brake feed passage and the flow of fluid to said brake feed passage for limiting the pressure rise in said brake feed passage while providing a high flow rate until the pressure level in said brake feed passage operating on said secondary pressure responsive area is sufficient to move said flow regulator valve means to said second position.

2. A brake control valve apparatus comprising: a source of fluid pressure; a brake feed passage; a primary brake apply passage; a secondary brake apply passage in fluid communication with the primary brake apply passage; exhaust passage means; brake apply regulator valve means comprising operator input means for establishing a desired braking level, valve means operatively connected with the operator input means for controlling fluid flow from said source of fluid pressure to said primary brake apply passage at a pressure level determined by said operator input means; flow regulator valve means for selectively connecting said source to said secondary brake apply passage comprising a first pressure responsive area means for urging said flow regulator valve means to a first position connecting said source to said secondary brake apply passage in response to fluid pressure is said primary brake apply passage, and a second pressure responsive area means in fluid communication with said brake feed passage for urging said flow regulator valve means to a second position disconnecting said source from said secondary brake apply passage in response to pressure in said brake feed passage; and flow restriction means and pressure reduction means disposed in parallel fluid flow relation between said primary brake apply passage and said brake feed passage for establishing a pressure differential between said primary brake apply passage and said brake feed passage when the fluid flow therethrough is above a predetermined rate to limit the pressure acting on said second pressure responsive area to a level insufficient to overcome a force imposed on said flow regulator valve by the pressure acting on said first pressure responsive area means, and said pressure acting on said second pressure responsive area means being sufficient to cause said flow regulator valve to move to said second position to disconnect said source of fluid pressure from said secondary brake apply passage when the flow therethrough is below the predetermined rate.

* * * * *